United States Patent
Zhou et al.

(10) Patent No.: US 11,328,430 B2
(45) Date of Patent: May 10, 2022

(54) METHODS, SYSTEMS, AND MEDIA FOR SEGMENTING IMAGES

(71) Applicant: Arizona Board of Regents on behalf of Arizona State University, Scottsdale, AZ (US)

(72) Inventors: Zongwei Zhou, Tempe, AZ (US); Md Mahfuzur Rahman Siddiquee, Tempe, AZ (US); Nima Tajbakhsh, Los Angeles, CA (US); Jianming Liang, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/885,579

(22) Filed: May 28, 2020

(65) Prior Publication Data

US 2020/0380695 A1   Dec. 3, 2020

Related U.S. Application Data

(60) Provisional application No. 62/853,297, filed on May 28, 2019.

(51) Int. Cl.
*G06K 9/00* (2006.01)
*G06T 7/143* (2017.01)
*G06T 7/00* (2017.01)

(52) U.S. Cl.
CPC ............ *G06T 7/143* (2017.01); *G06T 7/0012* (2013.01); *G06T 2207/20081* (2013.01); *G06T 2207/20084* (2013.01); *G06T 2207/30004* (2013.01)

(58) Field of Classification Search
CPC .................. G06T 7/143; G06T 7/0012; G06T 2207/20084; G06T 2207/30004;
(Continued)

(56) References Cited

U.S. PATENT DOCUMENTS 10,325,371 B1 * 6/2019 Kim ..................... G06N 7/005
10,600,184 B2 * 3/2020 Golden .................. G06N 3/08
(Continued)

OTHER PUBLICATIONS

Sudre, C. H. et al, "Generalised Dice Overlap as a Deep Learning Loss Function for Highly Unbalanced Segmentations," in Deep Learning in Medical Image Analysis and Multimodal Learning for Clinical Decision Support, 2017, pp. 240-248, Springer, Cham.
(Continued)

*Primary Examiner* — Van D Huynh
(74) *Attorney, Agent, or Firm* — Elliott, Ostrander & Preston, P.C.

(57) ABSTRACT

Methods, systems, and media for segmenting images are provided. In some embodiments, the method comprises: generating an aggregate U-Net comprised of a plurality of U-Nets, wherein each U-Net in the plurality of U-Nets has a different depth, wherein each U-Net is comprised of a plurality of nodes $X^{i,j}$, wherein i indicates a down-sampling layer the U-Net, and wherein j indicates a convolution layer of the U-Net; training the aggregate U-Net by: for each training sample in a group of training samples, calculating, for each node in the plurality of nodes $X^{i,j}$, a feature map $x^{i,j}$, wherein $x^{i,j}$ is based on a convolution operation performed on a down-sampling of an output from $X^{i-1,j}$ when j=0, and wherein $x^{i,j}$ is based on a convolution operation performed on an up-sampling operation of an output from $X^{i+1,j-1}$ when j>0; and predicting a segmentation of a test image using the trained aggregate U-Net.

20 Claims, 8 Drawing Sheets

(58) Field of Classification Search
CPC . G06T 2207/20081; G06T 2207/10088; G06T 2207/10081; G06T 2207/30096; G06T 7/11
USPC .......................................................... 382/128
See application file for complete search history.

(56) References Cited

U.S. PATENT DOCUMENTS

| | | | | |
|---|---|---|---|---|
| 11,055,851 | B2* | 7/2021 | Novikov | .................... G06T 7/11 |
| 2017/0109881 | A1* | 4/2017 | Avendi | .................... G06T 7/149 |
| 2018/0108139 | A1* | 4/2018 | Abramoff | ................. G06T 7/11 |
| 2018/0260956 | A1* | 9/2018 | Huang | .................... B60W 30/10 |
| 2019/0130575 | A1* | 5/2019 | Chen | .......................... G06N 3/08 |
| 2019/0223725 | A1* | 7/2019 | Lu | ............................ G06N 3/084 |
| 2019/0236411 | A1* | 8/2019 | Zhu | ....................... G06K 9/6274 |
| 2020/0058126 | A1* | 2/2020 | Wang | .................... G06N 3/0481 |
| 2020/0167930 | A1* | 5/2020 | Wang | .................... G06T 7/0012 |
| 2020/0272841 | A1* | 8/2020 | Han | ...................... A61B 5/1073 |

OTHER PUBLICATIONS

Sun, K. et al, "Deep High-Resolution Representation Learning for Human Pose Estimation," in Proceedings of the IEEE International Conference on Computer Vision, 2019, pp. 5693-5703.

Sun, K. et al, "High-Resolution Representations for Labeling Pixels and Regions," arXiv: 1904.04514 [cs.CV], 2019.

Tajbakhsh, N. et al, "Embracing Imperfect Datasets: A Review of Deep Learning Solutions for Medical Image Segmentation," arXiv: 1908.10454v2 [eess.IV], 2019.

Tajbakhsh, N. et al, "ErrorNet: Learning error representations from limited data to improve vascular segmentation," arXiv:1910.04814 [eess.IV], 2019.

Wu, S. et al, "Automatical segmentation of pelvic organs after hysterectomy by using dilated convolution U-Net++," in 2019 IEEE 19th International Conference on Software Quality, Reliability and Security Companion (QRS-C), 2019, pp. 362-367, IEEE.

Xie, S. et al, "Holistically-Nested Edge Detection," in Proceedings of the IEEE international conference on computer vision, 2015, pp. 1395-1403.

Yang, C. et al, "EDA-Net: Dense Aggregation of Deep and Shallow Information Achieves Quantitative Photoacoustic Blood Oxygenation Imaging Deep in Human Breast," in International Conference on Medical Image Computing and Computer-Assisted Intervention, 2019, pp. 246-254, Springer, Cham.

Yu, F. et al, "Deep Layer Aggregation," in Proceedings of the IEEE conference on computer vision and pattern recognition, 2018, pp. 2403-2412.

Zhang, J. et al, "MDU-Net: Multi-scale Densely Connected U-Net for biomedical image segmentation," arXiv:1812.00352v2 [cs.CV], 2018.

Zhang, Y et al, "A Survey on Multi-Task Learning," arXiv:1707.08114v3 [cs.LG], 2017.

Zhang, Y. et al, "Customizable Architecture Search for Semantic Segmentation," in Proceedings of the IEEE Conference on Computer Vision and Pattern Recognition, 2019, pp. 11641-11650.

Zhang, Y. et al, "Web-Net: A Novel Nest Networks with Ultra-Hierarchical Sampling for Building Extraction from Aerial Imageries," Remote Sensing, vol. 11, No. 16, 2019, 1897.

Zhao, H. et al, "ICNet for Real-Time Semantic Segmentation on High-Resolution Images," in Proceedings of the European Conference on Computer Vision, 2018, pp. 405-420.

Zhou, C. et al, "Learning Contextual and Attentive Information for Brain Tumor Segmentation," in International MICCAI Brainlesion Workshop, 2018, pp. 497-507, Springer, Cham.

Zhou, S. K. et al, "Deep Learning for Medical Image Analysis," 2017, Academic Press.

Zhou, S. K. et al, "Deep Learning for Medical Image Analysis," 2017, Academic Press, (summary of book).

Zhou, Z., et al, "UNet++: A Nested U-Net Architecture for Medical Image Segmentation," in Deep Learning in Medical Image Analysis and Multimodal Learning for Clinical Decision Support, 2018, pp. 3-11, Springer, Cham.

Zhu, Q. et al, "Deeply-Supervised CNN for Prostate Segmentation," in International Joint Conference on Neural Networks (IJCNN), 2017, pp. 178-184, IEEE.

Zoph, B. et al, "Learning Transferable Architectures for Scalable Image Recognition," in Proceedings of the IEEE conference on computer vision and pattern recognition, 2018, pp. 8697-8710.

Zyuzin, V. et al, "Comparison of Unet architectures for segmentation of the left ventricle endocardial border on two-dimensional ultrasound images," in 2019 Ural Symposium on Biomedical Engineering, Radioelectronics and Information Technology (USBEREIT), 2019, pp. 110-113, IEEE.

Armato III, S. G. et al., "The Lung Image Database Consortium (LIDC) and Image Database Resource Initiative (IDRI): A Completed Reference Database of Lung Nodules on CT Scans," Medical physics, vol. 38, No. 2, 2011, pp. 915-931.

Bengio, Y. et al., "Learning Deep Architectures for AI," Foundations and trends in Machine Learning, vol. 2, No. 1, 2009, pp. 1-127.

Cai, Z. et al, "A Unified Multi-scale Deep Convolutional Neural Network for Fast Object Detection," in Proceedings of the European Conference on Computer Vision, 2016, pp. 354-370, Springer, Cham.

Cardona, A. et al, "An Integrated Micro-and Macroarchitectural Analysis of the Drosophila Brain by Computer-Assisted Serial Section Electron Microscopy," PLoS biology, vol. 8, No. 10, 2010, e1000502.

Chartrand, G. et al, "Deep Learning: A Primer for Radiologists," Radiographics, vol. 37, No. 7, 2017, pp. 2113-2131.

Chaurasia, A. et al, "LinkNet: Exploiting Encoder Representations for Efficient Semantic Segmentation," in 2017 IEEE Visual Communications and Image Processing (VCIP), 2017, pp. 1-4, IEEE.

Chen, F. et al, "An improved framework called Du++ applied to brain tumor segmentation," in 2018 15th International Computer Conference on Wavelet Active Media Technology and Information Processing (ICCWAMTIP), 2018, pp. 85-88, IEEE.

Chen, H. et al, "Deep Contextual Networks for Neuronal Structure Segmentation," in Thirtieth AAAI conference on artificial intelligence, 2016, pp. 1167-1173.

Ciompi, F. et al, "Automatic classification of pulmonary perifissural nodules in computed tomography using an ensemble of 2D views and a convolutional neural network out-of-the-box," Medical image analysis, vol. 26, No. 1, 2015, pp. 195-202.

Cui, H. et al, "Pulmonary Vessel Segmentation based on Orthogonal Fused U-Net++ of Chest CT Images," in International Conference on Medical Image Computing and Computer-Assisted Intervention, 2019, pp. 293-300, Springer, Cham.

Dietterich, T. G., "Ensemble Methods in Machine Learning," in International workshop on multiple classifier systems, 2000, pp. 1-15, Springer, Berlin, Heidelberg.

Dou, Q. et al, "3D deeply supervised network for automated segmentation of volumetric medical images," Medical image analysis, vol. 41, 2017, pp. 40-54.

Dou, Q. et al, "3D Deeply Supervised Network for Automatic Liver Segmentation from CT Volumes," in International Conference on Medical Image Computing and Computer-Assisted Intervention, 2016, pp. 149-157, Springer, Cham.

Drozdzal, M. et al, "The Importance of Skip Connections in Biomedical Image Segmentation," in Deep Learning and Data Labeling for Medical Applications. 2016, pp. 179-187, Springer, Cham.

Falk, T. et al, "U-Net: deep learning for cell counting, detection, and morphometry," Nature methods, vol. 16, 2018, pp. 67-70.

Fang, J. et al, "An Improved MPB-CNN Segmentation Method for Edema Area and Neurosensory Retinal Detachment in SD-OCT Images," in International Workshop on Ophthalmic Medical Image Analysis, 2019, pp. 130-138, Springer, Cham.

Fang, Y. et al, "Selective Feature Aggregation Network with Area-Boundary Constraints for Polyp Segmentation," in International Conference on Medical Image Computing and Computer-Assisted Intervention, 2019, pp. 302-310, Springer, Cham.

(56) References Cited

OTHER PUBLICATIONS

Fourure, D. et al, "Residual Conv-Deconv Grid Network for Semantic Segmentation," arXiv:1707.07958v2 [cs.CV], 2017.
Hamaguchi, R. et al, "Effective Use of Dilated Convolutions for Segmenting Small Object Instances in Remote Sensing Imagery," in IEEE Winter Conference on Applications of Computer Vision (WACV), 2018, pp. 1442-1450, IEEE.
Hariharan, B. et al, "Hypercolumns for Object Segmentation and Fine-grained Localization," in Proceedings of the IEEE conference on computer vision and pattern recognition, 2015, pp. 447-456.
He, K. et al, "Deep Residual Learning for Image Recognition," in Proceedings of the IEEE conference on computer vision and pattern recognition (CVPR), 2016, pp. 770-778.
He, K. et al, "Identity Mappings in Deep Residual Networks," in Proceedings of the European Conference on Computer Vision, 2016, pp. 630-645, Springer, Cham.
He, K. et al, "Mask R-CNN," in Proceedings of the IEEE international conference on computer vision, 2017, pp. 2980-2988.
Hinton, G. et al, "Distilling the Knowledge in a Neural Network." arXiv preprint arXiv:1503.02531, 2015.
Hoo-Chang, S. et al, "Deep Convolutional Neural Networks for Computer-Aided Detection: CNN Architectures, Dataset Characteristics and Transfer Learning," IEEE transactions on medical imaging, vol. 35, No. 5, 2016, pp. 1285-1298.
Hu, R. et al, "Learning to Segment Every Thing," in Proceedings of the IEEE conference on computer vision and pattern recognition, 2018, pp. 4233-4241.
Huang, G. et al, "Densely Connected Convolutional Networks," in Proceedings of the IEEE conference on computer vision and pattern recognition, 2017, pp. 4700-4708.
Jiang, J. et al, "Multiple Resolution Residually Connected Feature Streams for Automatic Lung Tumor Segmentation From CT Images," IEEE transactions on medical imaging, vol. 38, No. 1, 2019, pp. 134-144.
Kistler, M. et al, "The Virtual Skeleton Database: An Open Access Repository for Biomedical Research and Collaboration," Journal of Medical Internet Research, vol. 15, No. 11, 2013, e245.
Lee, C.Y. et al, "Deeply-Supervised Nets," in Artificial Intelligence and Statistics, 2015, pp. 562-570, PMLR.
Li, X. et al, "Partial Order Pruning: for Best Speed/Accuracy Trade-off in Neural Architecture Search," in Proceedings of the IEEE Conference on Computer Vision and Pattern Recognition, 2019, pp. 9145-9153.
Lin, G. et al, "Refinenet: Multi-Path Refinement Networks for High-Resolution Semantic Segmentation," In Proceedings of the IEEE Conference on Computer Vision and Pattern Recognition, 2017, pp. 1925-1934.
Lin, T.Y. et al, "Feature Pyramid Networks for Object Detection," in Proceedings of the IEEE conference on computer vision and pattern recognition, 2017, pp. 2117-2125.

Litjens, G. et al, "A survey on deep learning in medical image analysis," Medical image analysis, vol. 42, 2017, pp. 60-88.
Liu, C. et al, "Auto-DeepLab: Hierarchical Neural Architecture Search for Semantic Image Segmentation," in Proceedings of the IEEE Conference on Computer Vision and Pattern Recognition, 2019, pp. 82-92.
Liu, C. et al, "Progressive Neural Architecture Search," in Proceedings of the European Conference on Computer Vision (ECCV), 2018, pp. 19-34.
Long, J. et al, "Fully Convolutional Networks for Semantic Segmentation," in Proceedings of the IEEE conference on computer vision and pattern recognition, 2015, pp. 3431-3440.
Meng, C. et al, "Multiscale dense convolutional neural network for DSA cerebrovascular segmentation," Neurocomputing, vol. 373, 2020, pp. 123-134.
Menze, B. H. et al., "The Multimodal Brain Tumor Image Segmentation Benchmark (BRATS)," IEEE transactions on medical imaging, vol. 34, No. 10, 2015, pp. 1993-2024.
Meyer, M. G. et al, "The Cell-CT 3-Dimensional Cell Imaging Technology Platform Enables the Detection of Lung Cancer Using the Noninvasive LuCED Sputum Test," Cancer cytopathology, vol. 123, No. 9, 2015, pp. 512-523.
Milletari, F. et al, "V-Net: Fully Convolutional Neural Networks for Volumetric Medical Image Segmentation," in Fourth International Conference on 3D Vision (3DV), 2016, pp. 565-571, IEEE.
Noh, H. et al, "Learning Deconvolution Network for Semantic Segmentation," in Proceedings of the IEEE international conference on computer vision, 2015, pp. 1520-1528.
Peng, D. et al, "End-to-End Change Detection for High Resolution Satellite Images Using Improved UNet++," Remote Sensing, vol. 11, No. 11, 2019, 1382.
Pohlen, T. et al, "Full-Resolution Residual Networks for Semantic Segmentation in Street Scenes," in Proceedings of the IEEE Conference on Computer Vision and Pattern Recognition, 2017, pp. 4151-4160.
Ronneberger, O. et al, "U-Net: Convolutional Networks for Biomedical Image Segmentation," in International Conference on Medical image computing and computer-assisted intervention, 2015, pp. 234-241, Springer, Cham.
Shen, D. et al, "Deep Learning in Medical Image Analysis," Annual Review of Biomedical Engineering, vol. 19, 2017, pp. 221-248.
Shenoy, A. A., "Feature optimization of contact map predictions based on inter-residue distances and U-Net++ architecture," 2019.
Simonyan, K. et al, "Very Deep Convolutional Networks for Large-Scale Image Recognition," arXiv preprint arXiv:1409.1556, 2014.
Song, G. et al, "Collaborative Learning for Deep Neural Networks," in Neural Information Processing Systems (NeurIPS), 2018.
Song, T. et al, "U-Next: A Novel Convolution Neural Network With an Aggregation U-Net Architecture for Gallstone Segmentation in CT Images," IEEE Access, vol. 7, 2019, pp. 166823-166832.

* cited by examiner

METHODS, SYSTEMS, AND MEDIA FOR SEGMENTING IMAGES

CROSS REFERENCE TO RELATED APPLICATION

This application claims the benefit of U.S. Provisional Patent Application No. 62/853,297, filed May 28, 2019, which is hereby incorporated by reference herein in its entirety.

STATEMENT REGARDING GOVERNMENT FUNDED RESEARCH

This invention was made with government support under R01 HL128785 awarded by the National Institutes of Health. The government has certain rights in the invention.

TECHNICAL FIELD

The disclosed subject matter relates to methods, systems, and media for segmenting images.

BACKGROUND

Encoder-decoder networks have been used to implement techniques for image segmentation, for example, to identify portions of a medical image that correspond to healthy tissue and portions of the medical image that correspond to diseased tissue (e.g., a brain tumor or lesion, a lung nodule, etc.). The success of encoder-decoder networks can largely be attributed to skip connections, which combine deep, semantic, coarse-grained feature maps from the decoder sub-network with shallow, low-level, fine-grained feature maps from the encoder sub-network.

However, there are limitations to the use of these encoder-decoder networks for image segmentation. First, the optimal depth of an encoder-decoder network can vary from one application to another, depending on difficulty of a task and an amount of labeled data available for training the network. It can be time-consuming and resource intensive to train multiple models of varying depths separately and then aggregate the resulting models while applying the models during a testing phase. Secondly, the design of skip connections used in an encoder-decoder network can be unnecessarily restrictive, demanding fusion of feature maps from a same-scale encoder and decoder pair.

Accordingly, it is desirable to provide new methods, systems, and media for segmenting images.

SUMMARY

Methods, systems, and media for segmenting images are provided. In accordance with some embodiments of the disclosed subject matter, a method for segmenting images is provided, the method comprising: generating an aggregate U-Net comprised of a plurality of U-Nets, wherein each U-Net in the plurality of U-Nets has a different depth, wherein each U-Net is comprised of a plurality of nodes $X^{i,j}$, wherein i indicates a layer of a plurality of down-sampling layers of the U-Net, wherein j indicates a convolution layer of a plurality of convolution layers of the U-Net, and wherein a maximum value for i and j for each U-Net is the depth of the U-Net; identifying a group of training samples, wherein each training sample in the group of training samples includes an image and a ground truth annotation that indicates at least two segments, each corresponding to one of at least two categories, within the image; training the aggregate U-Net using the group of training samples, wherein training the aggregate U-Net comprises: for each training iteration in a series of training iterations and for each training sample in the group of training samples, calculating, for each node in the plurality of nodes $X^{i,j}$, a feature map $x^{i,j}$, wherein $x^{i,j}$ is based on a convolution operation performed on a down-sampling of an output from $X^{i-1,j}$ when j=0, and wherein $x^{i,j}$ is based on a convolution operation performed on an up-sampling operation of an output from $X^{i+1,j-1}$ when j>0; and predicting a segmentation of a test image using the trained aggregate U-Net, wherein the predicted segmentation indicates a location of at least two segments within the image corresponding to the at least two categories.

In accordance with some embodiments of the disclosed subject matter, a system for segmenting images is provided, the system comprising: a memory; and a hardware processor that, when executing computer-executable instructions stored in the memory, is configured to: generate an aggregate U-Net comprised of a plurality of U-Nets, wherein each U-Net in the plurality of U-Nets has a different depth, wherein each U-Net is comprised of a plurality of nodes $X^{i,j}$, wherein i indicates a layer of a plurality of down-sampling layers of the U-Net, wherein j indicates a convolution layer of a plurality of convolution layers of the U-Net, and wherein a maximum value for i and j for each U-Net is the depth of the U-Net; identify a group of training samples, wherein each training sample in the group of training samples includes an image and a ground truth annotation that indicates at least two segments, each corresponding to one of at least two categories, within the image; train the aggregate U-Net using the group of training samples, wherein training the aggregate U-Net comprises: for each training iteration in a series of training iterations and for each training sample in the group of training samples, calculating, for each node in the plurality of nodes $X^{i,j}$, a feature map $x^{i,j}$, wherein $x^{i,j}$ is based on a convolution operation performed on a down-sampling of an output from $X^{i-1,j}$ when j=0, and wherein $x^{i,j}$ is based on a convolution operation performed on an up-sampling operation of an output from $X^{i+1,j-1}$ when j>0; and predict a segmentation of a test image using the trained aggregate U-Net, wherein the predicted segmentation indicates a location of at least two segments within the image corresponding to the at least two categories.

In accordance with some embodiments of the disclosed subject matter, non-transitory computer-readable media containing computer executable instructions that, when executed by a processor, cause the processor to perform a method for segmenting images is provided. The method comprises: generating an aggregate U-Net comprised of a plurality of U-Nets, wherein each U-Net in the plurality of U-Nets has a different depth, wherein each U-Net is comprised of a plurality of nodes $X^{i,j}$, wherein i indicates a layer of a plurality of down-sampling layers of the U-Net, wherein j indicates a convolution layer of a plurality of convolution layers of the U-Net, and wherein a maximum value for i and j for each U-Net is the depth of the U-Net; identifying a group of training samples, wherein each training sample in the group of training samples includes an image and a ground truth annotation that indicates at least two segments, each corresponding to one of at least two categories, within the image; training the aggregate U-Net using the group of training samples, wherein training the aggregate U-Net comprises: for each training iteration in a series of training iterations and for each training sample in the group of training samples, calculating, for each node in the plurality of nodes $X^{i,j}$, a feature map $x^{i,j}$, wherein $x^{i,j}$ is based on a convolution operation performed on a down-sampling of an output from $X^{i-1,j}$ when j=0, and wherein $x^{i,j}$ is based on a convolution operation performed on an up-sampling operation of an output from $X^{i+1,j-1}$ when j>0; and predicting a segmentation of a test image using the trained aggregate U-Net, wherein the predicted segmentation indicates a location of at least two segments within the image corresponding to the at least two categories.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
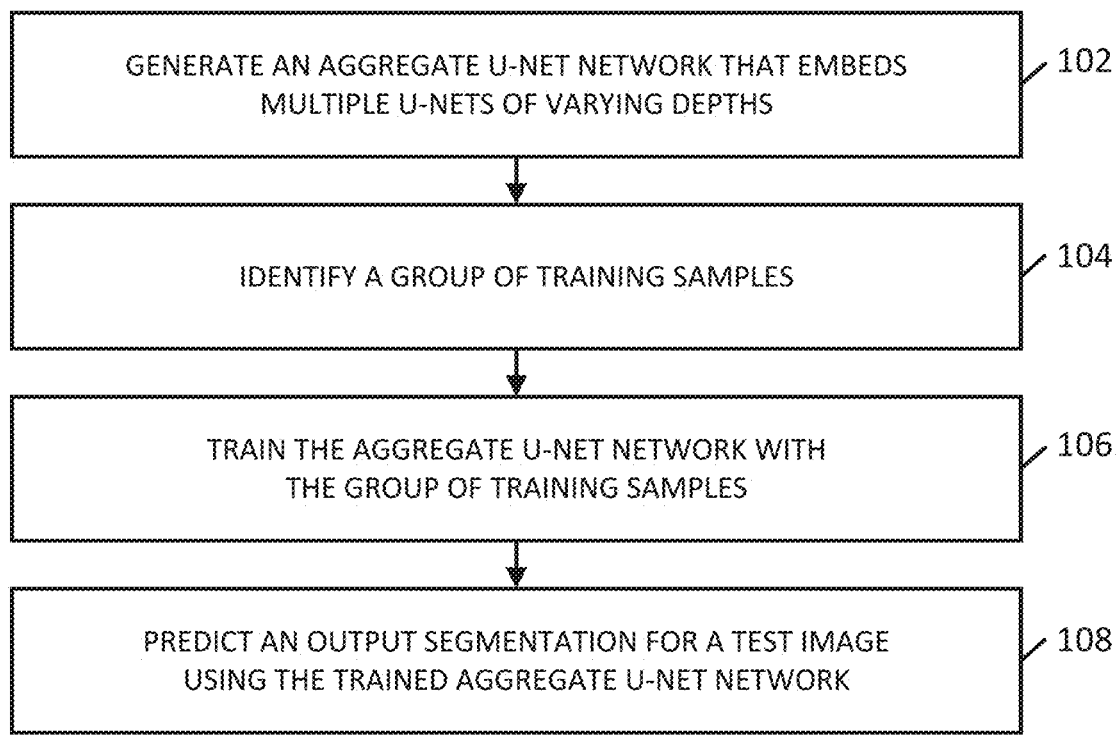
FIG. 1 shows an example of a process for segmenting images in accordance with some embodiments of the disclosed subject matter.

In accordance with various embodiments, mechanisms (which can include methods, systems, and media) for segmenting images are provided.

In some embodiments, the mechanisms described herein can generate a network architecture suitable for image segmentation. In some embodiments, the mechanisms described herein can be used to train a network to perform any suitable type of image segmentation. For example, in some embodiments, a network can be trained to perform semantic segmentation. As a more particular example, in some embodiments, a network can be trained to indicate portions of an image that correspond to a first category of a group of categories, portions of an image that correspond to a second category of the group of categories, etc. As a specific example, in an instance in which the network is trained using medical images (e.g., MRI images, CT images, and/or any other suitable type of medical images), the network can be trained to indicate portions of a medical image that correspond to healthy tissue and portions of the medical image that correspond to diseased tissue (e.g., a lesion or tumor, a nodule, and/or any other suitable type of diseased tissue). As another example, in some embodiments, a network can be trained to perform instance segmentation. As a more particular example, in some embodiments, a network can be trained to indicate portions of an image that correspond to a first instance of a first category of a group of categories, a second instance of the first category of the group of categories, a first instance of a second category of the group of categories, etc. As a specific example, in an instance in which the network is trained using images of cells, the network can be trained to indicate a first cell and a second cell, a first cell membrane and a second cell membrane, etc.

In some embodiments, a generated network can include any suitable type of network, such as one or more convolutional neural networks (CNNs). For example, in some embodiments, a generated network can include one or more U-Nets. As referred to herein, a U-Net can be a particular type of CNN that takes an image as an input, generates one or more feature maps that represent segments within the input, and produces, as an output, a segmented image. In particular, as shown in and described below in more detail in connection with FIGS. 2A and 2B, in some embodiments, a U-Net can generate one or more feature maps by iteratively down-sampling the image and/or a feature map associated with the image through a layer of encoder nodes. In some embodiments, the U-Net can then reconstruct a segmented image by successively up-sampling the feature maps through a decoder node. Note that U-Nets are described below in more detail in connection with FIGS. 2A and 2B.

In some embodiments, the mechanisms described herein can generate a network that can be an aggregate U-Net network that includes multiple (e.g., two, three, four, five, and/or any other suitable number) embedded U-Nets. Note that, by creating a network that includes multiple embedded U-Nets, the mechanisms described herein can train the aggregate U-Net network using U-Nets with different numbers of encoding layers (e.g., with different depths), thereby training a network to perform image segmentation without knowing, prior to training of the network, an optimal depth of the network.

Examples of network architectures that include multiple embedded U-Nets are shown in and described below in connection with FIGS. 2C-2E. In some embodiments, a generated aggregate U-Net network can include connections between any suitable nodes of the aggregate U-Net network, as shown in and described below in more detail in connection with FIGS. 2C-2E. For example, as shown in and described below in connection with FIG. 2C, in some embodiments, an aggregate U-Net network can include multiple U-Nets, each with a different number of layers of encoders, and the aggregate U-Net network can aggregate feature maps generated by each of the different U-Nets embedded in the aggregate U-Net network. As another example, as shown in and described below in connection with FIG. 2E, in some embodiments, connections can connect nodes within the aggregate U-Net network such that each decoder node in the aggregate U-Net network receives both final aggregated feature maps as well as intermediate aggregate feature maps, thereby allowing each decoder node to learn using either same-scale encoder feature maps or using a collection of available feature maps.

In some embodiments, a generated aggregate U-Net network can be trained in any suitable manner, as described below in connection with 106 of FIG. 1. For example, in some embodiments, an aggregate U-Net network can be trained using deep supervision, as described below in more detail in connection with 106 of FIG. 1.

In some embodiments, a trained aggregate U-Net network can be used to predict an output segmentation for a test image. For example, as described above, in some embodiments, a trained aggregate U-Net network can be used to indicate portions of a test image that correspond to a first category of a group of categories (e.g., healthy tissue, and/or any other suitable first category) and portions of the test image that correspond to a second category of the group of categories (e.g., diseased tissue, and/or any other suitable second category). In some embodiments, a trained aggregate U-Net network can be pruned after training in any suitable manner to predict an output segmentation of a test image. For example, in an instance where the aggregate U-Net network includes four embedded U-Nets (e.g., as shown in and described below in connection with FIG. 2E), the aggregate U-Net network can be pruned, after training, to include any subset of the four (e.g., using one U-Net, using two U-Nets, and/or any other suitable subset) embedded U-Nets to predict output segmentations for test images. By training an aggregate U-Net network using more U-Nets than that used for predicting test output segmentations, a pruned network can more quickly predict outputs while retaining information learned by embedded U-Nets during training that were pruned prior to testing. More particularly, use of deep supervision during training of an aggregate U-Net network (as described below in more detail in connection with 106 of FIG. 1) can allow pruning of the aggregate U-Net network during application of the aggregate U-Net network, leading to a significant increase in speed for model prediction for test samples.

Note that, in some embodiments, in an instance in which MRI images are used by the mechanisms described herein, any suitable type(s) of MRI images can be used, such as High-grade (HG) images, Low-grade (LG) images, Flair images, T1 images, T1c images, T2 images, and/or any other suitable type(s) of images. Additionally, in some embodiments, a particular network can be trained using a combination of different types of MRI images.

Turning to FIG. 1, an example 100 of a process for segmenting images is shown in accordance with some embodiments of the disclosed subject matter. Note that, in some embodiments, blocks of process 100 can be executed on any suitable device, such as a server, a desktop computer, a laptop computer, and/or any other suitable type of device. Additionally or alternatively, in some embodiments, blocks of process 100 can be executed on multiple devices.

Process 100 can begin at 102 by generating an aggregate U-Net network that embeds multiple U-Nets of varying depths.

Turning to FIGS. 2A-2E, examples of U-Net architectures are shown in accordance with some embodiments of the disclosed subject matter. As illustrated in FIGS. 2A-2E, a downward arrow can indicate down-sampling, an upward arrow can indicate up-sampling, and a dotted arrow can indicate a skip connection, which are described below in more detail. In some embodiments, as known in the art, down-sampling can refer to taking, as an input, an image or a feature map of a first size (e.g., 512×512, and/or any other suitable size) and generating a lower resolution image or a lower resolution feature map (e.g., 272×272). In some embodiments, as known in the art, up-sampling can refer to taking, as an input, an image or a feature map of a first size (e.g., 272×272) and generating a higher-resolution image or a higher-resolution feature map. In some embodiments, a skip connection can refer to a first node that passes, without altering, an image or a feature map to a second node.

Figure 2A:
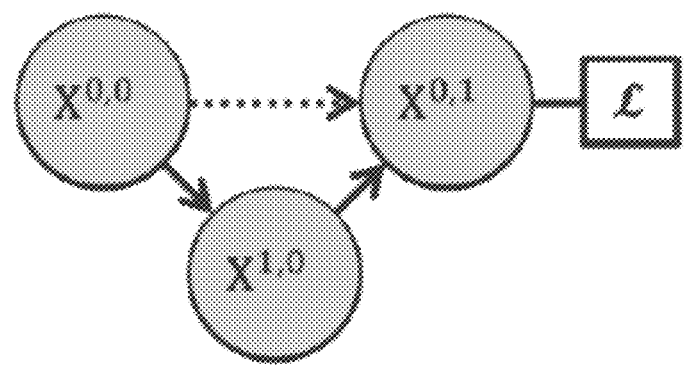
FIGS. 2A-2E show example schematic diagrams of networks for segmenting images in accordance with some embodiments of the disclosed subject matter.

Turning to FIG. 2A, an example of a U-Net with a depth of 1 is shown in accordance with some embodiments of the disclosed subject matter. As illustrated, in some embodiments, a U-Net can include any suitable number of nodes, $X^{i,j}$. In some embodiments, each node $X^{i,j}$ can represent a convolution block. In some embodiments, node $X^{0,0}$ can be an encoder node of the U-Net. In some embodiments, the down-sampling function that is performed during traversal from node $X^{0,0}$ to $X^{1,0}$ can be performed in any suitable manner. For example, in some embodiments, a convolution filter can be applied to an input image at $X^{0,0}$ to generate a feature map. In some embodiments, the convolution filter can be a matrix of any suitable size (e.g., 3×3 and/or any other suitable size). In some embodiments, down-sampling can then be performed using any suitable type of spatial subsampling (e.g., max pooling, average pooling, and/or any other suitable type of spatial subsampling) to reduce a dimensionality of a feature map as the U-Net network is traversed from Node $X^{0,0}$ to $X^{1,0}$. For example, in some embodiments, in an instance where an input image has 512×512 pixels (e.g., an input image at node $X^{0,0}$), a feature map generated at node $X^{1,0}$ can be a down-sampled image that represents features of the image, and the feature map can have fewer pixels than the image at node $X^{0,0}$ (e.g., 272×272, and/or any other suitable number of pixels). For example, as shown in FIG. 2A, there is one down-sampling layer (between node $X^{0,0}$ and node $X^{1,0}$), therefore, the U-Net shown in FIG. 2A has a depth of 1.

In some embodiments, following the down-sampling layers, the feature map can then be expanded through any suitable up-sampling layers (represented by the up arrows in FIG. 2A) to generate an output segmented image at an output decoder (node $X^{0,1}$). In some embodiments, the up-sampling layer can include any suitable functions. For example, in some embodiments, at each node in the up-sampling layer (e.g., at node $X^{0,1}$ in FIG. 2A), a deconvolution filter of any suitable size (e.g., 3×3, and/or any other suitable size) can be applied, followed by any suitable type of spatial up-sampling to increase a dimensionality of the feature map. In some embodiments, an output image at an output decoder node of the U-Net can be a segmented image of the same size as an input image at an input encoder node of the U-Net. For example, in some embodiments, referring to FIG. 2A, an output segmented image at node $X^{0,1}$ can have a same size as an input image at node $X^{0,0}$.

Note that, in some embodiments, a number of down-sampling layers can be equal to a number of up-sampling layers. For example, referring to FIG. 2A, there is one down-sampling layer (e.g., indicated by the down arrow between node $X^{0,0}$ and node $X^{1,0}$) and one up-sampling layer (e.g., indicated by the up arrow between node $X^{1,0}$ and $X^{0,1}$). In some embodiments, a depth of a U-Net can refer to a number of down-sampling layers, or, equivalently, a number of up-sampling layers.

Figure 2B:
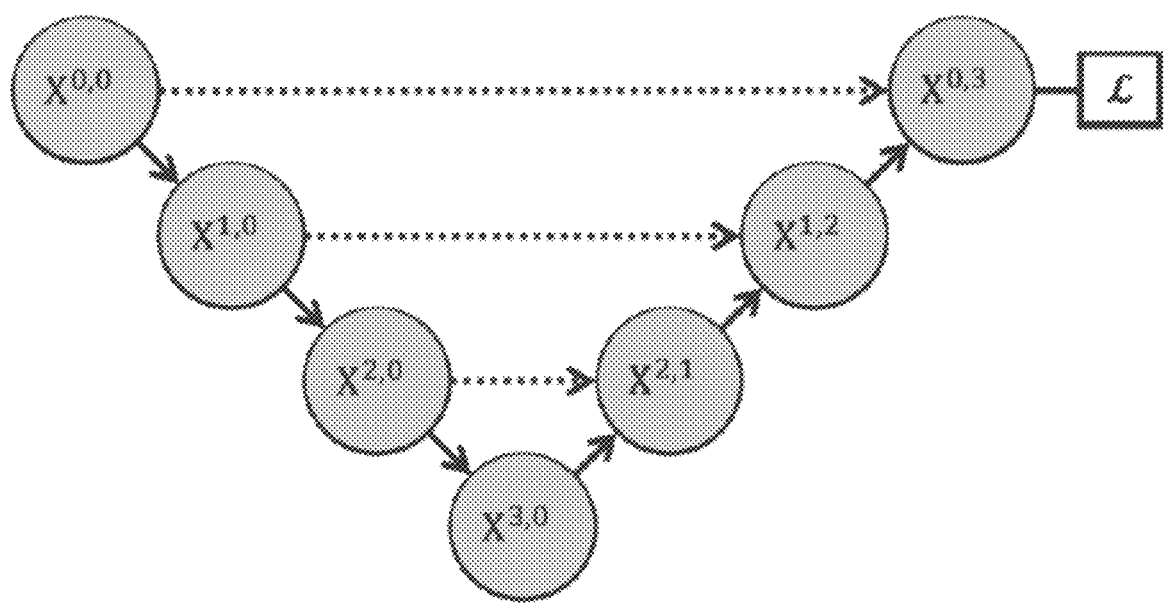

Turning to FIG. 2B, an example of a U-Net with a depth of 3 is shown in accordance with some embodiments of the disclosed subject matter. Note that there are three down-sampling layers shown in the network of FIG. 2B (between $X^{0,0}$ and $X^{1,0}$, between $X^{1,0}$ and $X^{2,0}$, and between $X^{2,0}$ and $X^{3,0}$) and three up-sampling layers (between $X^{3,0}$ and $X^{2,1}$, between $X^{2,1}$ and $X^{1,2}$, and between $X^{1,2}$ and $X^{0,3}$), indicating a depth of 3. As illustrated in FIG. 2B, node $X^{0,3}$ can represent a decoder node.

Figure 2C:
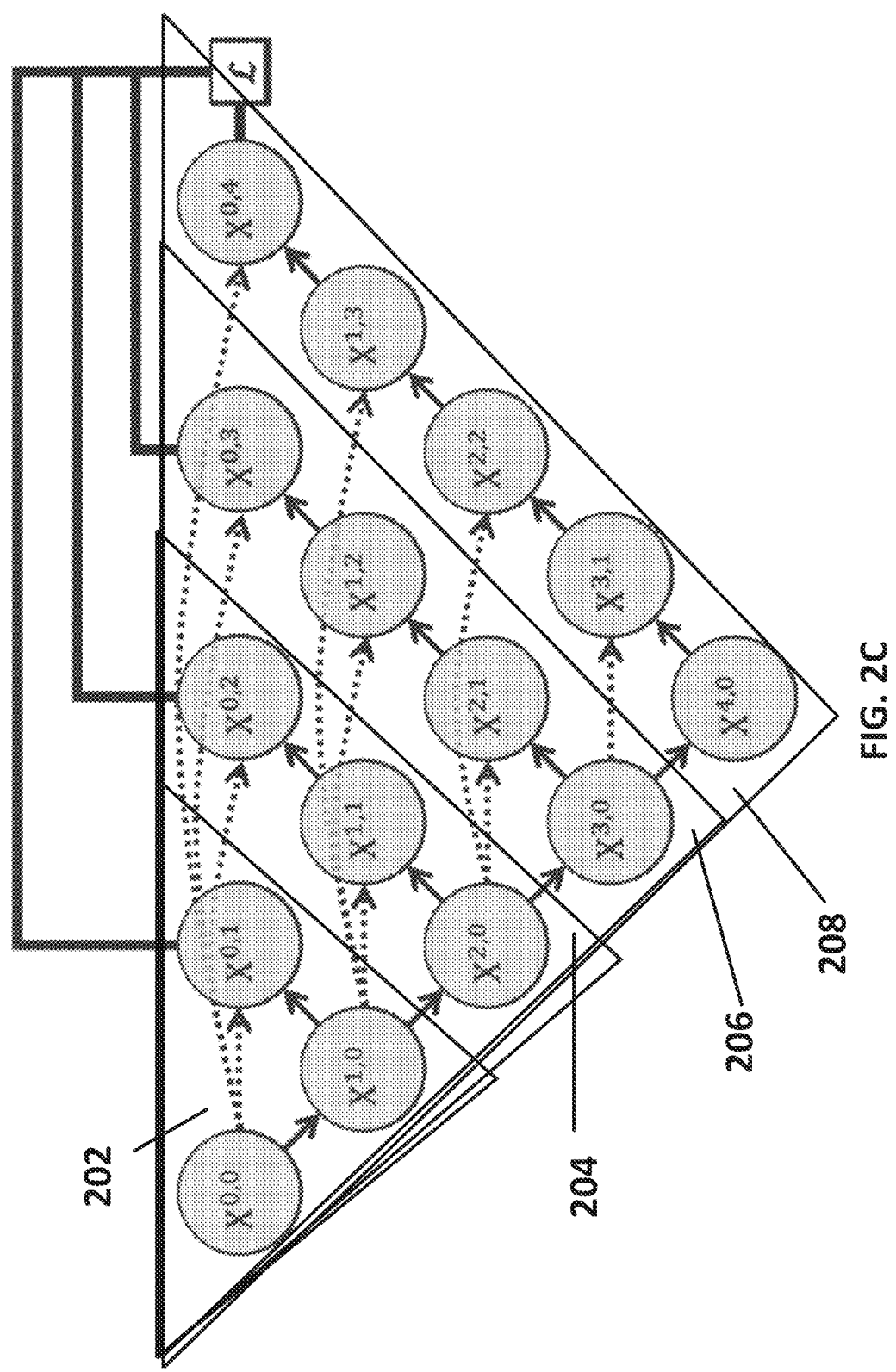

Turning to FIG. 2C, an example of an aggregate U-Net that combines multiple U-Nets of varying depths into one unified architecture is shown in accordance with some embodiments of the disclosed subject matter. Note that, the aggregate U-Net shown in FIG. 2C is generally referred to herein as U-Net$^e$. As illustrated, the U-Net$^e$ architecture shown in FIG. 2C includes four U-Nets (e.g., U-Nets 202, 204, 206, and 208) of depths 1, 2, 3, and 4, respectively. As illustrated, each of the U-Nets shown in FIG. 2C partially share the same encoder. Additionally, as illustrated in FIG. 2C, each U-Net included in the U-Net$^e$ has its own decoder (e.g., nodes $X^{0,1}$, $X^{0,2}$, $X^{0,3}$, and $X^{0,4}$).

Note that, in some embodiments, the U-Net$^e$ shown in FIG. 2C can benefit from knowledge sharing, because each U-Net within the U-Net$^e$ partially shares the same encoder. However, note that, because the decoders in the U-Net$^e$ are disconnected, deeper U-Nets in the U-Net$^e$ do not offer a supervision signal to decoders of shallower U-Nets in the aggregate U-Net. In particular, note that, referring to FIG. 2C, node $X^{0,1}$ is not connected to node $X^{0,2}$, node $X^{0,2}$ is not connected to node $X^{0,3}$, and node $X^{0,3}$ is not connected to node $X^{0,4}$ via skip connections (dashed lines). In addition, note that the supervision signal is derived from node $X^{0,4}$. Additionally, note that the design of skip connections (that is, the dotted lines shown in FIG. 2C) requires the U-Net$^e$ network to combine decoder feature maps with only same-scale feature maps from the encoder. That is, in the U-Net$^e$ network, feature maps from a U-Net of a particular depth are not combined with feature maps from U-Nets of other depths. For example, feature maps from U-Net 202 with depth 1 are not combined with feature maps from U-Nets of depths 2, 3, or 4 (that is, with feature maps from U-Nets 204, 206, and 208).

In some embodiments, a U-Net$^e$ can be trained in any suitable manner. For example, in some embodiments, a separate loss function can be defined for each U-Net in the architecture. In some embodiments, any suitable deep supervision scheme can be used to train the U-Net$^e$. For example, in some embodiments, auxiliary loss functions can be added to nodes along the decoder network, i.e., $X^{4-j,j}$, $j \in \{1, 2, 3, 4\}$. Alternatively, in some embodiments, the auxiliary loss functions can be applied to nodes $X^{0,j}$, $j \in \{1, 2, 3, 4\}$. In some such embodiments, the output from each U-Net in the aggregate U-Net$^e$ network can be averaged at an inference time.

Figure 2D:
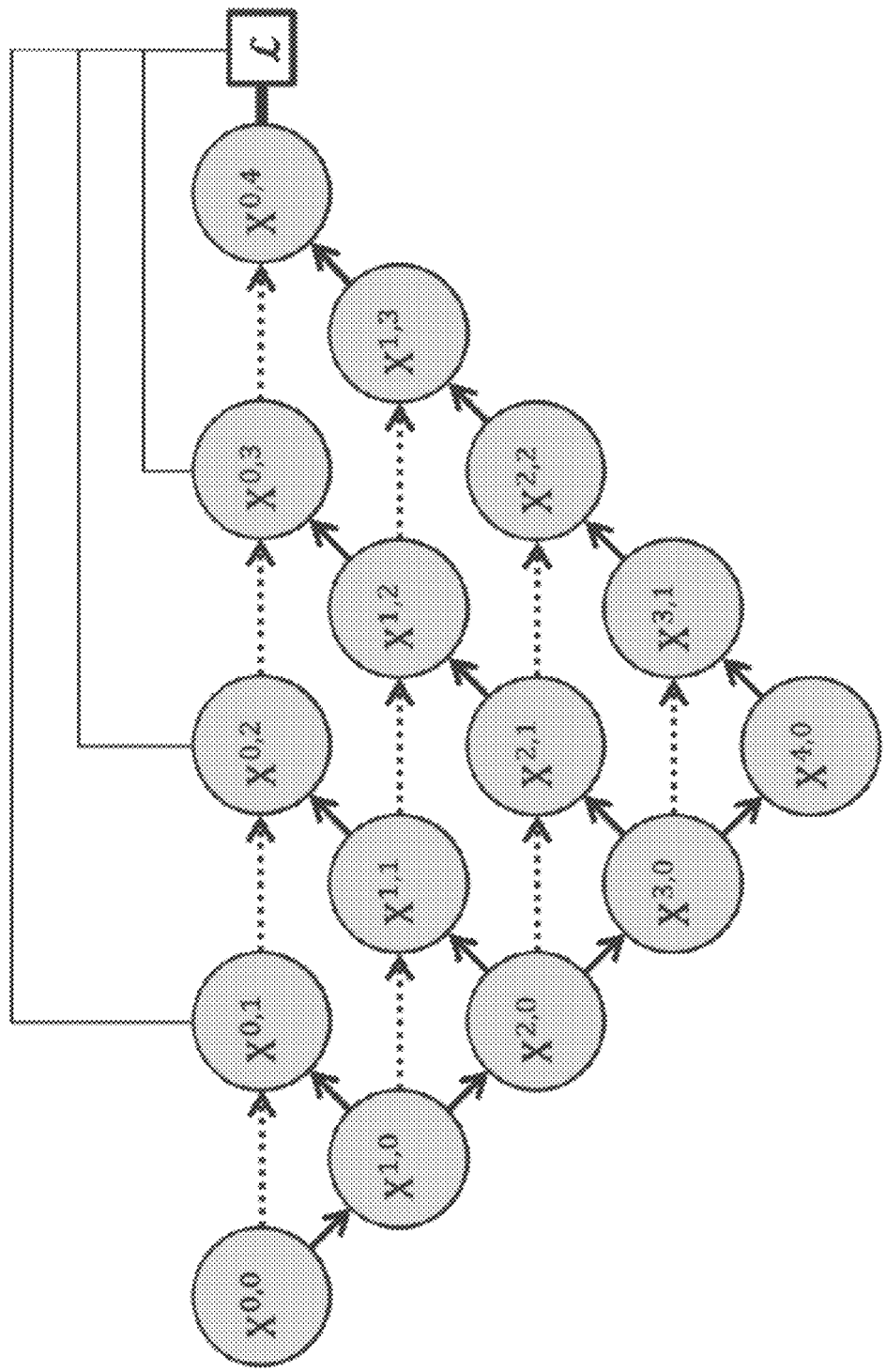

Turning to FIG. 2D, another example of an aggregate U-Net that combines multiple U-Nets of varying depths into one unified architecture is shown in accordance with some embodiments of the disclosed subject matter. Note that, the aggregate U-Net shown in FIG. 2D is generally referred to herein as UNet+. Similarly to the U-Net$^e$ architecture shown in and described above in connection with FIG. 2C, the UNet+ architecture includes four U-Nets, of depths 1, 2, 3, and 4, respectively. However, relative to the U-Net$^e$ architecture shown in FIG. 2C, the long skip connections of U-Net$^e$ (e.g., a skip connection from node $X^{0,0}$ to $X^{0,2}$, a skip connection from node $X^{1,0}$ to $X^{1,2}$, etc.) have been removed, and every two adjacent nodes in the UNet+ architecture have been connected with a skip connection (e.g., $X^{0,0}$ to $X^{0,1}$, $X^{0,1}$ to $X^{0,2}$, $X^{1,0}$ to $X^{1,1}$, etc.). Note that, due to connections between adjacent nodes, the UNet+ architecture shown in FIG. 2D connects disjoint decoders, thereby allowing backpropagation from deeper decoders to shallower counterparts. Additionally, note that each decoder node of the UNet+ architecture (e.g., $X^{0,j}$) is presented with an aggregation of all feature maps computed in a shallower stream.

Figure 2E:
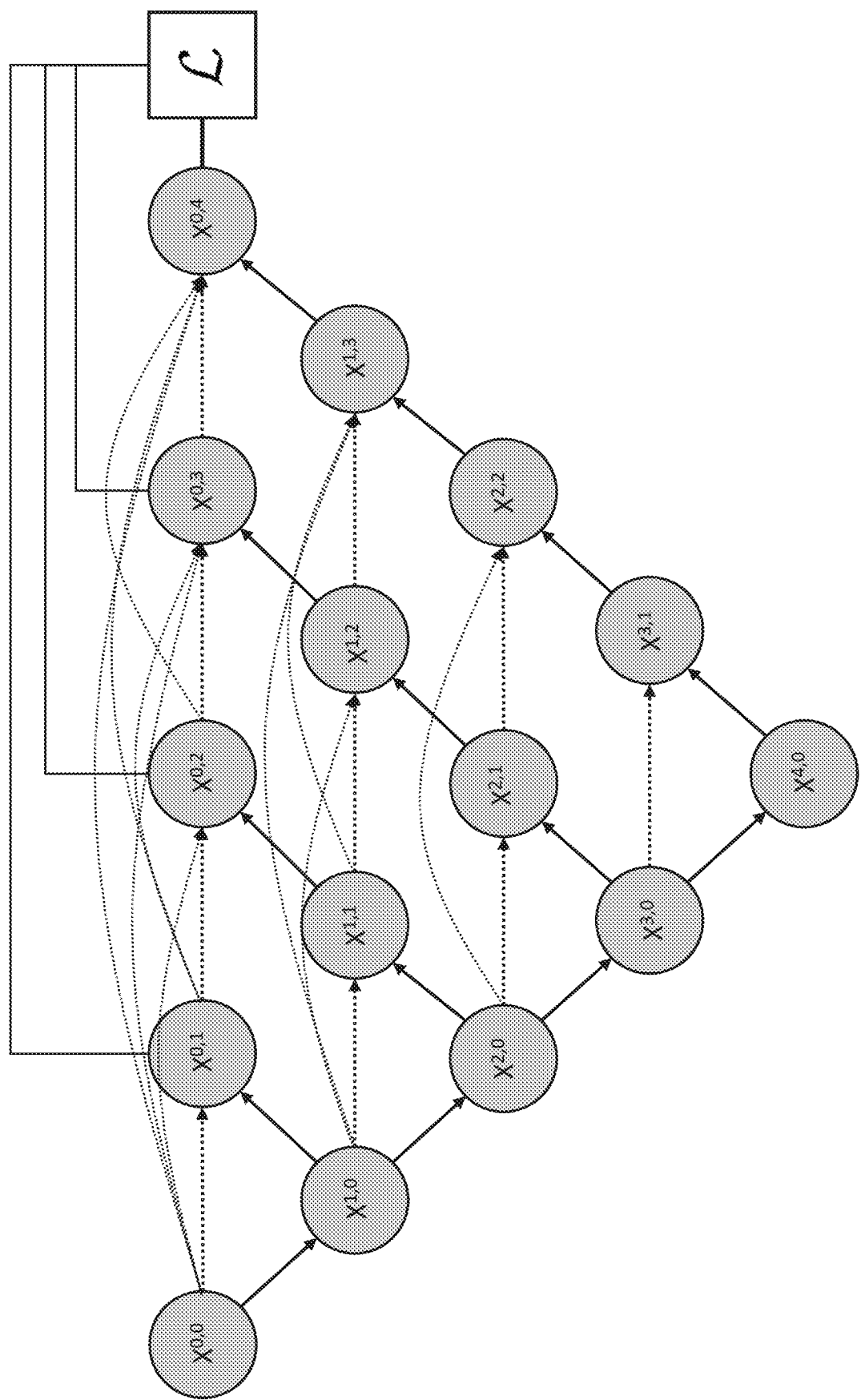

Turning to FIG. 2E, yet another example of an aggregate U-Net that combines multiple U-Nets of varying depths into one unified architecture is shown in accordance with some embodiments of the disclosed subject matter. Note that, the aggregate U-Net shown in FIG. 2E is generally referred to herein as UNet++. Similarly to the architectures shown in and described above in connection with FIGS. 2C and 2D, the UNet++ architecture shown in FIG. 2E includes four U-Nets, of depths 1, 2, 3, and 4, respectively. Relative to the UNet+ architecture shown in FIG. 2D, the UNet++ architecture includes dense connectivity such that each decoder node in the UNet++ architecture is presented with both final aggregated feature maps, intermediate aggregated feature maps, and original same-scale feature maps from the encoder. Therefore, an aggregation layer associated with a decoder node can learn to use either the same-scale encoder feature maps or use all collected feature maps available.

Note that, in some embodiments, deep supervision can be used in the UNet+ and UNet++ architecture, as described below in connection with 106 of FIG. 1. However, in some embodiments, the UNet+ and UNet++ architecture can be trained without using deep supervision. Conversely, in some embodiments, the U-Net$^e$ architecture shown in and described above in connection with FIG. 2C can require deep supervision during training. Note that, as shown in FIG. 2C, the dark lines connecting nodes $X^{0,1}$, $X^{0,2}$, $X^{0,3}$, and $X^{0,4}$ to a loss function indicate that deep supervision is required in the U-Net$^e$ architecture, whereas, referring to FIGS. 2D and 2E, the light lines connecting nodes $X^{0,1}$, $X^{0,2}$, $X^{0,3}$, and $X^{0,4}$ to a loss function indicate that deep supervision is optional in the UNet+ and UNet++ architectures.

Referring back to FIG. 1, in some embodiments, process 100 can generate the aggregate U-Net network at 102 in any suitable manner. For example, in some embodiments, process 100 can determine a number of U-Nets (e.g., two, three, four, five, ten, and/or any other suitable number) that are to be embedded in the aggregate U-Net network. Continuing with this example, process 100 can determine a depth of each U-Net to be embedded in the aggregate U-Net network. Process 100 can then generate each of the U-Nets including any suitable nodes included in each U-Net. In some embodiments, process 100 can then identify connections between nodes of each U-Net. For example, in some embodiments, process 100 can identify nodes that are to be connected with a down-sampling connection, nodes that are to be connected with an up-sampling connection, nodes that are to be connected with a skip connection, and/or any other suitable connections, as shown in and described above in connection with FIGS. 2C-2E. As a more particular example, in some embodiments, process 100 can generate a UNet++ network, as shown in and described above in connection with FIG. 2E with any suitable number of embedded U-Nets (e.g., two, three, four, five, ten, and/or any other suitable number).

At 104, process 100 can identify a group of training samples. In some embodiments, each training sample in the group of training samples can include an image. Additionally, in some embodiments, each training sample in the group of training samples can include a corresponding annotated ground truth segmentation map. For example, in some embodiments, an annotated ground truth segmentation map can indicate portions of a corresponding image that belong to a particular category of a group of categories. As a more particular example, in an instance in which a training image corresponds to an image captured by an electron microscope or other imaging modality, the ground truth segmentation map can indicate portions of a corresponding training image that include cells, membranes, and/or any other suitable categories. As another more particular example, in an in which a training image corresponds to a medical image (e.g., an MRI image, a CT image, and/or any other suitable image) of a portion of a body of a patient (e.g., a portion of a brain, a portion of a lung, and/or any other suitable portion of a body), the ground truth segmentation map can indicate portions of a corresponding training image that include healthy areas of the portion of the body of the patient and portions of the corresponding training image that include diseased areas of the portion of the body (e.g., that include a tumor or a lesion, a nodule, and/or any other suitable diseased area or abnormality).

Note that, in some embodiments, an annotated ground truth segmentation map can be in any suitable format. For example, in some embodiments, an annotated ground truth segmentation map can be an image of a same size as a corresponding training image, where the annotated ground truth image is colored with a number of colors corresponding to a number of categories each training image is to be segmented into. As a more particular example, in an instance in which an image segmentation task to be performed by a trained network is to identify portions of an input image that correspond to one of two categories (e.g., cells and membranes, healthy tissue and diseased tissue, and/or any other suitable categories), an annotated ground truth segmentation map can be a black and white image, where black indicates portions of a training image corresponding to a first category (e.g., healthy tissue) of the two categories, and where white indicates portions of the training image corresponding to a second category (e.g., diseased tissue) of the two categories. As another example, in some embodiments, an annotated ground truth segmentation map can be any suitable mask (e.g., a binary cell mask indicating cells, a nuclei mask indicating cell nuclei, and/or any other suitable masks). Note that, in some embodiments, an annotated ground truth segmentation map can include any suitable number of labels. For example, in some embodiments, in an instance in which images correspond to brain images, an annotated ground truth segmentation map can have multiple labels corresponding to a positive class (e.g., "necrosis," "edema," "non-enhancing tumor," and/or "enhancing tumor,"), and a negative class. Note that, in some embodiments, a classification as positive or negative can be assigned after assigning a label to a portion of an image.

Note that, in some embodiments, training samples can be obtained from any suitable location. For example, in some embodiments, training samples can be obtained from a dataset of labeled training images. In some embodiments, a dataset of labeled training images can be provided by any suitable entity. In some embodiments, images in a dataset of images can be captured using any suitable type of imaging modality (e.g., an electron microscope, a cell-CT imaging system, brightfield microscopy, fluorescent microscopy, MRI scanner, CT scanner, and/or any other suitable imaging modality).

In some embodiments, images in a group of training samples can be processed in any suitable manner. For example, in some embodiments, images can be cropped to be any suitable size. As a more particular example, in some embodiments, images can be cropped such that each image in the group of training samples is the same size (e.g., 512×512 pixels, 256×256 pixels, and/or any other suitable size). In some embodiments, images can be rescaled or resized in any suitable manner. As another example, in some embodiments, in an instance in which images include MRI images, images can be pre-processed such that any suitable slices are removed (e.g., blank slices, slices with small brain areas, and/or any other suitable slices). As yet another example, in an instance in which images in the group of training samples include three-dimensional (3D) images (e.g., 3D CT images, and/or any other suitable 3D images), images can be re-sampled to any suitable volume (e.g., 1-1-1 spacing, and/or any other suitable spacing), and cropped to any suitable 3D size.

Note that, in some embodiments, images can be selected for inclusion in the group of training samples or excluded from the group of training samples based on any suitable criteria. For example, in an instance in which an image is a medical image of a portion of a body of a patient (e.g., a brain, a lung, a liver, and/or any other suitable portion of a body), images can be selected such that the portion of the body occupies more than a predetermined portion of each image (e.g., more than ten pixels, more than one hundred pixels, and/or any other suitable portion of the image).

At 106, process 100 can train the aggregate U-Net network using the group of training samples. In some embodiments, process 100 can train the aggregate U-Net network in any suitable manner. For example, in some embodiments, process 100 can calculate a feature map or a stack of feature maps represented by each node $X^{i,j}$ using any suitable function or group of functions. As a more particular example, feature maps represented by $X^{i,j}$ can be calculated as:

$$x^{i,j} = \begin{cases} \mathcal{H}(\mathcal{D}(x^{i-1,j})), & j = 0 \\ \mathcal{H}([[x^{i,k}]_{k=0}^{j-1}, \mathcal{U}(x^{i+1,j-1})]), & j > 0 \end{cases}$$

In some embodiments, H( ) can be a convolution operation followed by an activation function. In some embodiments, D( ) and U( ) can denote a down-sampling layer and an up-sampling layer, respectively. In some embodiments [ ] can denote a concatenation layer. Note that, referring to FIG. 2E, nodes at level j=0 (e.g., $X^{1,0}$, $X^{2,0}$, etc.) receive one input from the previous layer of the encoder; nodes at level j=1 receive two inputs, both from the encoder sub-network but at two consecutive levels; and nodes at level j>1 receive j+1 inputs, of which j inputs are the outputs of the previous j nodes in the same skip connection and the j+1$^{th}$ input is the up-sampled output from the lower skip connection. Note that, because of the architecture of the UNet++ network (as shown in FIG. 2E), prior feature maps accumulate and arrive at a particular node, in particular, due to use of a dense convolution block along each skip connection.

In some embodiments, as described above, process 100 can use deep supervision while training the network. In some embodiments, process 100 can use deep supervision while training the network in any suitable manner. For example, in some embodiments, process 100 can append a 1×1 convolution with C kernels followed by a sigmoid activation function to the outputs from nodes $X^{0,1}$, $X^{0,2}$, $X^{0,3}$, and $X^{0,4}$ (e.g., as shown in FIG. 2E), where C can be the number of classes observed in a dataset of training samples. In some embodiments, process 100 can use a hybrid segmentation loss function. For example, in some embodiments, a hybrid segmentation loss function can include a pixel-wise cross-entropy loss and a soft dice-coefficient loss for each semantic scale. As a more particular example, an example of a hybrid loss function can be:

$$\mathcal{L}(Y, P) = -\frac{1}{N} \sum_{c=1}^{C} \sum_{n=1}^{N} \left( y_{n,c} \log p_{n,c} + \frac{2 y_{n,c} p_{n,c}}{y_{n,c}^2 + p_{n,c}^2} \right)$$

In some embodiments, $y_{n,c}$ and $p_{n,c} \in P$ can denote the target labels and the predicted probabilities for class c and the n$^{th}$ pixel in a batch of training images, and N can indicate the number of pixels within one batch. Note that, in some embodiments, a target can be a flattened target which can correspond to a representation of the annotated ground truth for a particular training sample, described above in connection with 104. In some embodiments, an overall loss function used by process 100 can then be defined as a weighted summation of the hybrid losses from each decoder:

$$\mathcal{L} = \sum_{i=1}^{d} \eta_i \cdot \mathcal{L}_{(Y, P^i)}.$$

In some embodiments, d can indicate an index of the decoder. Note that, in some embodiments, each weight $\eta_i$ can have any suitable value. For example, in some embodiments, weights $\eta_i$ can all be equal to each other (e.g., each $\eta_i$ can be 1, and/or any other suitable value). Conversely, in some embodiments, any of weights $\eta_i$ can be different from each other. Additionally, note that, in some embodiments, process 100 can optionally perform any suitable processing on ground-truth images, such as applying a Gaussian blur, and/or any other suitable processing. Alternatively, in some embodiments, process 100 can utilize ground-truth images without any processing on the ground-truth images.

In some embodiments, process 100 can train and/or validate a trained network using any suitable technique or combination of techniques. For example, in some embodiments, any suitable optimizer (e.g., Adam, and/or any other suitable optimizer) can be used to optimize loss functions. As another example, in some embodiments, any suitable learning rate can be used (e.g., 3e-4, and/or any other suitable learning rate). As another example, in some embodiments, process 100 can use an early stopping technique to determine a number of iterations of training at which to stop training of the network to avoid overfitting of the network during training. As a more particular example, in some embodiments, process 100 can use an early stopping technique using a validation set that includes any suitable number of images. Note that, in some such embodiments, process 100 can generate a validation set in any suitable manner. For example, in some embodiments, when constructing the group of training samples as described above in connection with 104, process 100 can generate a validation set using any suitable images or samples from a dataset used to construct the group of training samples, such that samples included in the validation set are not included in the group of training samples. Additionally, note that, in some embodiments, process 100 can use any suitable metric or combination of metrics to assess a fit of the network at a particular iteration, such as dice-coefficient, Intersection over Union (IOU), and/or any other suitable metric(s).

In some embodiments, images can be assigned to training, validation, and/or test sets in any suitable manner. For example, in some embodiments, images taken from a group of medical patients (e.g., 20 patients, 30 patients, 40 patients, and/or any other suitable number) can be divided into any suitable number of folds (e.g., three folds, five folds, ten folds, and/or any other suitable number of folds), where each fold includes images from a subset of the patients. As a more particular example, in an instance in which images have been taken from 30 patients and in which there are five folds, each of the five folds can include images from six patients. Continuing with this example, in some embodiments, a training set can be formed from a first subset of the folds (e.g., from three folds, and/or any other suitable number), a validation set can be formed from a second subset of the folds (e.g., from one fold, and/or any other suitable number), and a test set can be formed from a third set of the folds (e.g., from one fold, and/or any other suitable number).

Note that, in some embodiments, the network can be implemented using any suitable software library or libraries (e.g., Keras with a Tensorflow backend, and/or any other suitable libraries). Additionally, note that, in some embodiments, the network and/or any training of the network can be implemented on any suitable type of device with any suitable type(s) of processor(s). For example, in some embodiments, the network and/or any training of the network can be implemented on one or more devices that include any suitable number (e.g., one, two, three, and/or any other suitable number) of Graphics Processing Units (GPUs) (e.g., an NVIDIA TITAN X, and/or any other suitable type of GPU) associated with any suitable amount of memory each (e.g., 10 GB, 12 GB, and/or any other suitable amount).

At 108, process 100 can predict an output segmentation for a test image using the trained aggregate U-Net Network. In some embodiments, process 100 can predict the output segmentation for the test image in any suitable manner. For example, in some embodiments, process 100 can use the test image as an input to the trained aggregate U-Net network and can predict the output segmentation using any suitable weights or other parameters that have been determined as a result of training of the aggregate U-Net network. In some embodiments, the predicted output segmentation for the test image can include any suitable information, such as portions of the test image that correspond to a first category of a group of categories (e.g., healthy tissue, a cell, and/or any other suitable first category), portions of the test image that correspond to a second category of the group of categories (e.g., diseased tissue, a cell membrane, and/or any other suitable second category), and/or any other suitable information. Note that, in some such embodiments, the group of categories can include any suitable number of categories or classes corresponding to a number of categories or classes used in the annotated ground truth provided in connection with each training sample in the group of training samples.

In some embodiments, process 100 can predict the output segmentation using a pruned architecture of the trained aggregate U-Net network. That is, in an instance in which the aggregate U-Net network generated at 102 and trained at 106 includes four embedded U-Nets (e.g., as shown in FIG. 2E), process 100 can predict the output segmentation using a number of U-Nets that is smaller than four (e.g., one, two, or three). Note that, once a UNet++ network (as shown in and described above in connection with FIG. 2E) is trained, a decoder path for depth d at inference time can be independent from a decoder path for depth d+1. Therefore, in some embodiments, when predicting an output segmentation for a test image using a trained UNet++ network, a decoder for depth d+1 can be removed, obtaining a shallower version of the trained UNet++ at depth d.

Figure 5:
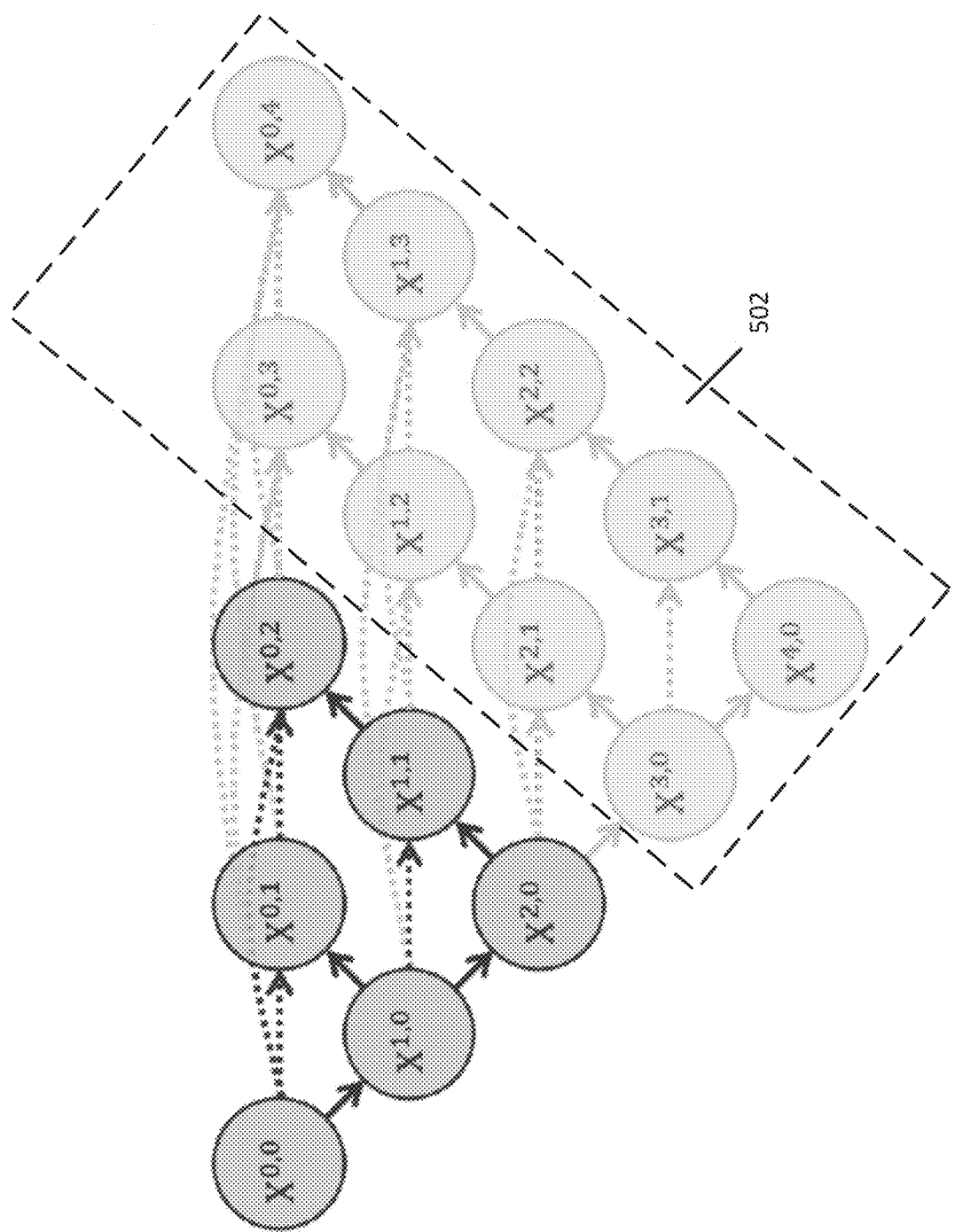
FIG. 5 shows an example schematic diagram of a pruned network architecture that can be used to segment a test sample in accordance with some embodiments of the disclosed subject matter.

Note that, in some embodiments, a level of pruning can be determined in any suitable manner. For example, in some embodiments, process 100 can determine a level of pruning based on a performance of the trained aggregate network on a validation set (as described above in connection with 106). As a more particular example, in some embodiments, process 100 can evaluate a performance of the trained network at each potential depth for samples in the validation set, and can determine speeds to predict outputs for samples in the validation set as well as an accuracy of predictions (e.g., using IOU, and/or any other suitable metric). As a specific example, referring to the UNet++ architecture shown in FIG. 2E, in some embodiments, process 200 can evaluate performance of the trained network using depths of 1, 2, 3, and 4, and can calculate speed and accuracy metrics for performance of the trained network at each depth when using the validation set. Turning to FIG. 5, an example of using a UNet++ architecture trained using four embedded U-Nets that is evaluated using a pruned architecture of two U-Nets (that is, pruned at a depth of 2) is shown in accordance with some embodiments of the disclosed subject matter. As illustrated in FIG. 5, pruned nodes 502 (e.g., $X^{0,3}$, $X^{0,4}$, $X^{1,2}$, $X^{1,3}$, etc.) indicate nodes that were included during network training but that are pruned during an inference phase.

In some embodiments, process 100 can determine an optimal pruned depth of the network based on any suitable criteria indicating a tradeoff between the speed and accuracy metrics. For example, in some embodiments, process 100 can identify a depth d at which a speed metric of the trained network shows more than a predetermined reduction (e.g., more than 30% faster, more than 60% faster, and/or any other suitable reduction) compared to the network when evaluated at depth d+1 with less than a predetermined reduction in accuracy (e.g., less than 1%, less than 5%, and/or any other suitable reduction). As another example, in some embodiments, process 100 can identify an optimal pruned depth of the network based on user-specified criteria, such as a maximum duration of time for inference of a test sample, and/or any other suitable criteria.

Note that, although the techniques described above are generally implemented with respect to semantic segmentation, in some embodiments, the techniques described herein can be implemented with respect to instance segmentation. For example, in some embodiments, any suitable network architecture (e.g., Mask R-CNN, Feature Pyramid Network (FPN), and/or any other suitable architecture) can be modified by replacing plain skip connections with the redesigned skip connections of the UNet++ architecture shown in and described above in connection with FIG. 2E.

Additionally, note that, in some embodiments, process 100 can provide any other suitable information. For example, in some embodiments, process 100 can generate a visualization of feature maps at different nodes of a trained aggregate U-Net network. As a more particular example, in some embodiments, process 100 can generate one or more images that represent feature maps from each of nodes $X^{0,1}$, $X^{0,2}$, $X^{0,3}$, and $X^{0,4}$ as shown in FIG. 2E. As a more particular example, in some embodiments, a representative feature map can be generated by averaging all feature maps for a particular layer.

Figure 3:
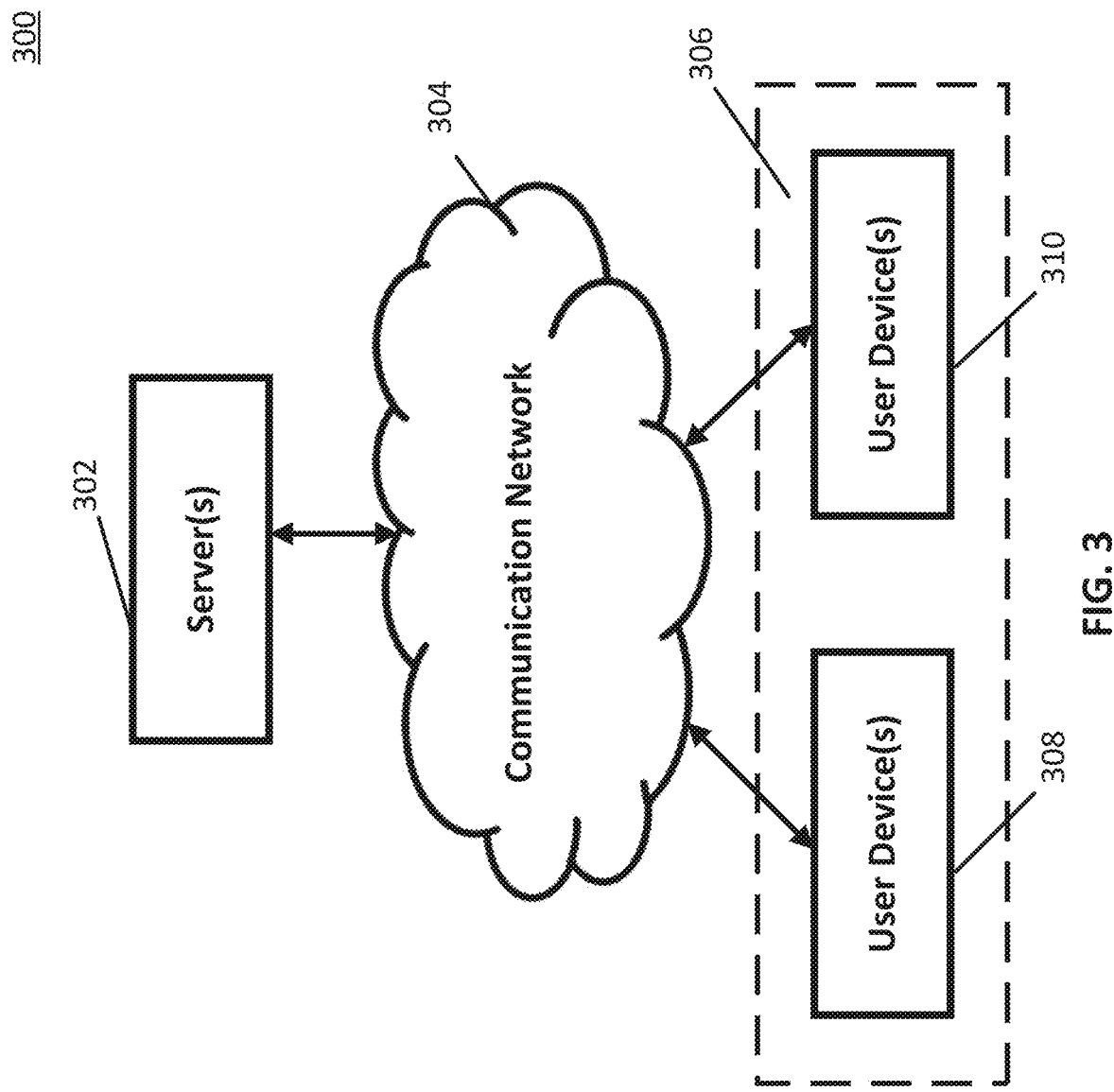
FIG. 3 shows a schematic diagram of an illustrative system suitable for implementation of mechanisms described herein for segmenting images in accordance with some embodiments of the disclosed subject matter.

Turning to FIG. 3, an example 300 of hardware for segmenting images that can be used in accordance with some embodiments of the disclosed subject matter is shown. As illustrated, hardware 300 can include a server 302, a communication network 304, and/or one or more user devices 306, such as user devices 308 and/or 310.

Server 302 can be any suitable server(s) for storing information, datasets, programs, and/or any other suitable type of content. For example, in some embodiments, server 302 can store any suitable datasets used for training, validating, or testing a network for segmenting images. In some embodiments, server 302 can transmit any portion of any suitable dataset to user devices 306, for example, in response to a request from user devices 306. Note that, in some embodiments, server 302 can execute any suitable programs or algorithms for segmenting images. For example, in some embodiments, server 302 can execute any of the blocks shown in and described above in connection with FIG. 1 for training a network to segment images. In some such embodiments, server 302 can receive any suitable parameters associated with training the network (e.g., a learning rate to be used, an indication of an optimization library to be used, depths of networks used, and/or any other suitable parameters) from user devices 306. In some embodiments, server 302 can be omitted.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 306 can be connected by one or more communications links to communication network 304 that can be linked via one or more communications links to server 302. The communications links can be any communications links suitable for communicating data among user devices 306 and server 302 such as network links, dial-up links, wireless links, hard-wired links, any other suitable communications links, or any suitable combination of such links.

User devices 306 can include any one or more user devices. In some embodiments, user devices 306 can perform any suitable function(s). For example, in some embodiments, user devices 306 can execute any suitable blocks shown in and described above in connection with FIG. 1 for segmenting images. As another example, in some embodiments, user devices 306 can initiate execution of any suitable blocks of process 100 on server 302, for example, by transmitting instructions to server 302 in connection with any suitable parameters for training a network for image segmentation. In some embodiments, user devices 306 can include any suitable types of user devices, such as a desktop computer, a laptop computer, a mobile phone, a tablet computer, and/or any other suitable type of user device.

Although server 302 is illustrated as one device, the functions performed by server 302 can be performed using any suitable number of devices in some embodiments. For example, in some embodiments, multiple devices can be used to implement the functions performed by server 302.

Although two user devices 308 and 310 are shown in FIG. 3 to avoid over-complicating the figure, any suitable number of user devices, and/or any suitable types of user devices, can be used in some embodiments.

Figure 4:
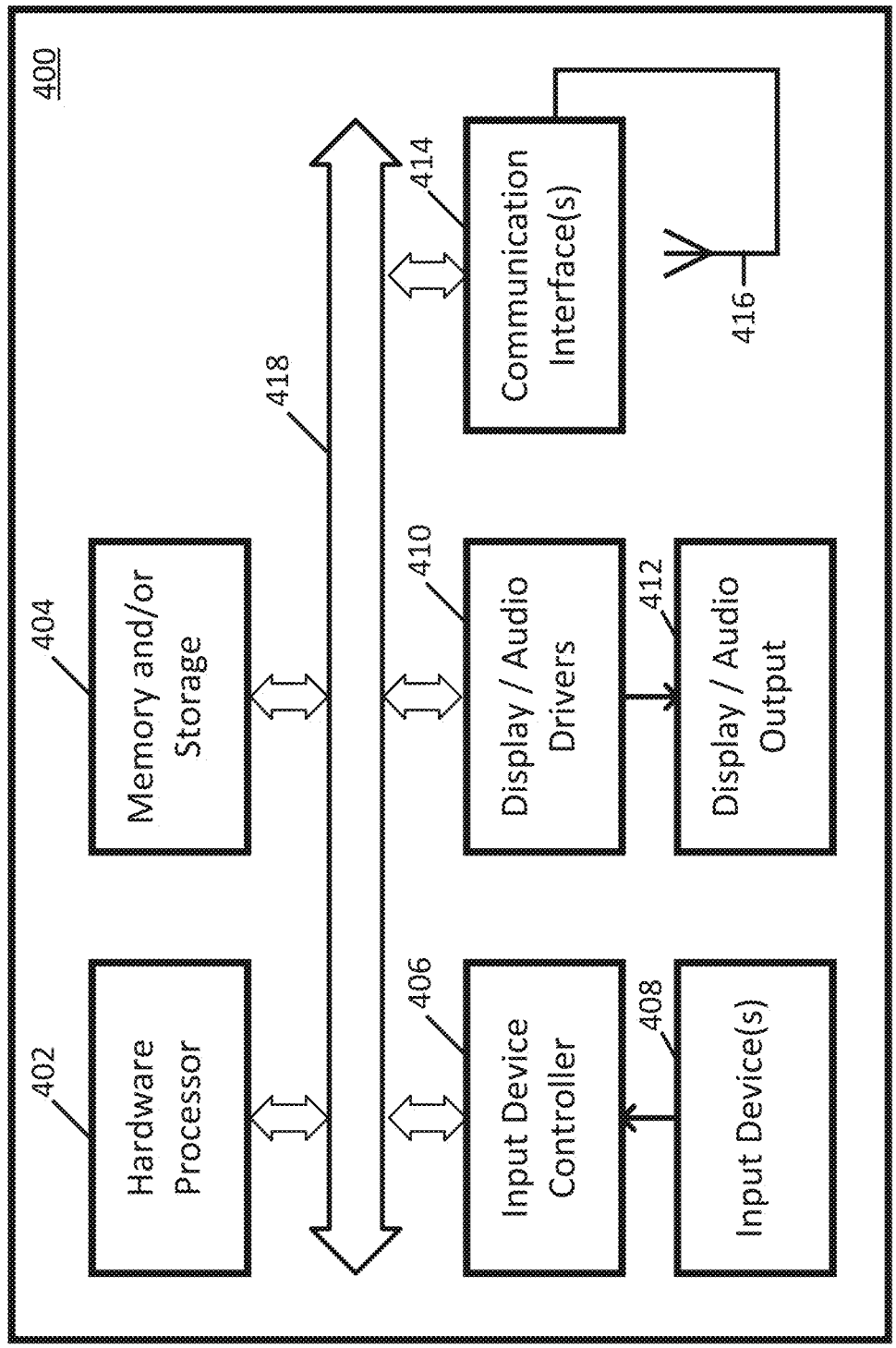
FIG. 4 shows a detailed example of hardware that can be used in a server and/or a user device of FIG. 3 in accordance with some embodiments of the disclosed subject matter.

Server 302 and user devices 306 can be implemented using any suitable hardware in some embodiments. For example, in some embodiments, devices 302 and 306 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 402 can be controlled by a server program stored in memory and/or storage of a server, such as server 302. In some embodiments, hardware processor 402 can be controlled by a computer program stored in memory and/or storage 404 of user device 306.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 304). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the process of FIG. 1 can be executed or performed in any order or sequence not limited to the order and sequence shown in and described in connection with the figure. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for segmenting images are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for segmenting images, comprising:

generating an aggregate U-Net comprised of a plurality of U-Nets, wherein each U-Net in the plurality of U-Nets has a different depth, wherein each U-Net is comprised of a plurality of nodes $X^{i,j}$, wherein i indicates a layer of a plurality of down-sampling layers of the U-Net, wherein j indicates a convolution layer of a plurality of convolution layers of the U-Net, and wherein a maximum value for i and j for each U-Net is the depth of the U-Net;

identifying a group of training samples, wherein each training sample in the group of training samples includes an image and a ground truth annotation that indicates at least two segments, each corresponding to one of at least two categories, within the image;

training the aggregate U-Net using the group of training samples, wherein training the aggregate U-Net comprises: for each training iteration in a series of training iterations and for each training sample in the group of training samples, calculating, for each node in the plurality of nodes $X^{i,j}$, a feature map $x^{i,j}$, wherein $x^{i,j}$ is based on a convolution operation performed on a down-sampling of an output from $X^{i-1,j}$ when j=0, and wherein $x^{i,j}$ is based on a convolution operation performed on an up-sampling operation of an output from $X^{i+1,j-1}$ when j>0; and predicting a segmentation of a test image using the trained aggregate U-Net, wherein the predicted segmentation indicates a location of the at least two segments within the image corresponding to the at least two categories.

2. The method of claim 1, wherein each node at level j receives j+1 inputs.

3. The method of claim 1, wherein the aggregate U-Net is trained using deep supervision.

4. The method of claim 1, further comprising:

calculating, for each training iteration in the series of training iterations, an intermediate loss function at each node $X^{0,j}$ based on a comparison of a predicted segmentation output at each node $X^{0,j}$ and the ground truth annotations for training samples in the group of training samples; and calculating an aggregate loss function that combines the intermediate loss functions of each node $X^{0,j}$, wherein the aggregate U-Net is trained using the aggregate loss function.

5. The method of claim 1, wherein each image corresponding to a training sample in the group of training samples is a medical image of a portion of a body of a patient, and wherein the ground truth annotation indicates a first segment corresponding to a first category of the at least two categories associated with a healthy portion of the portion of the body represented in the medical image and a second segment corresponding to a second category of the at least two categories associated with a diseased portion of the portion of the body represented in the medical image.

6. The method of claim 1, wherein the test image is a medical image of a portion of a body of a patient, and wherein the predicted segmentation of the test image includes a first segment corresponding to a first category of the two categories associated with a healthy portion of the portion of the body represented in the medical image and a second segment corresponding to a second category of the two categories associated with a diseased portion of the portion of the body represented in the medical image.

7. The method of claim 1, wherein the predicted segmentation is predicted using a subset of the plurality of U-Nets.

8. A system for segmenting images, the system comprising:
a memory; and
a hardware processor that, when executing computer-executable instructions stored in the memory, is configured to:
generate an aggregate U-Net comprised of a plurality of U-Nets, wherein each U-Net in the plurality of U-Nets has a different depth, wherein each U-Net is comprised of a plurality of nodes $X^{i,j}$, wherein i indicates a layer of a plurality of down-sampling layers of the U-Net, wherein j indicates a convolution layer of a plurality of convolution layers of the U-Net, and wherein a maximum value for i and j for each U-Net is the depth of the U-Net;
identify a group of training samples, wherein each training sample in the group of training samples includes an image and a ground truth annotation that indicates at least two segments, each corresponding to one of at least two categories, within the image;
train the aggregate U-Net using the group of training samples, wherein training the aggregate U-Net comprises: for each training iteration in a series of training iterations and for each training sample in the group of training samples, calculate, for each node in the plurality of nodes $X^{i,j}$, a feature map $x^{i,j}$, wherein $x^{i,j}$ is based on a convolution operation performed on a down-sampling of an output from $X^{i-1,j}$ when j=0, and wherein $x^{i,j}$ is based on a convolution operation performed on an up-sampling operation of an output from $X^{i+1,j-1}$ when j>0; and
predict a segmentation of a test image using the trained aggregate U-Net, wherein the predicted segmentation indicates a location of the at least two segments within the image corresponding to the at least two categories.

9. The system of claim 8, wherein each node at level j receives j+1 inputs.

10. The system of claim 8, wherein the aggregate U-Net is trained using deep supervision.

11. The system of claim 8, wherein the hardware processor is further configured to:
calculate, for each training iteration in the series of training iterations, an intermediate loss function at each node $X^{0,j}$ based on a comparison of a predicted segmentation output at each node $X^{0,j}$ and the ground truth annotations for training samples in the group of training samples; and
calculate an aggregate loss function that combines the intermediate loss functions of each node $X^{0,j}$, wherein the aggregate U-Net is trained using the aggregate loss function.

12. The system of claim 8, wherein each image corresponding to a training sample in the group of training samples is a medical image of a portion of a body of a patient, and wherein the ground truth annotation indicates a first segment corresponding to a first category of the at least two categories associated with a healthy portion of the portion of the body represented in the medical image and a second segment corresponding to a second category of the at least two categories associated with a diseased portion of the portion of the body represented in the medical image.

13. The system of claim 8, wherein the test image is a medical image of a portion of a body of a patient, and wherein the predicted segmentation of the test image includes a first segment corresponding to a first category of the two categories associated with a healthy portion of the portion of the body represented in the medical image and a second segment corresponding to a second category of the two categories associated with a diseased portion of the portion of the body represented in the medical image.

14. The system of claim 8, wherein the predicted segmentation is predicted using a subset of the plurality of U-Nets.

15. A non-transitory computer-readable medium containing computer executable instructions that, when executed by a processor, cause the processor to perform a method for segmenting images, the method comprising:
generating an aggregate U-Net comprised of a plurality of U-Nets, wherein each U-Net in the plurality of U-Nets has a different depth, wherein each U-Net is comprised of a plurality of nodes $X^{i,j}$, wherein i indicates a layer of a plurality of down-sampling layers of the U-Net, wherein j indicates a convolution layer of a plurality of convolution layers of the U-Net, and wherein a maximum value for i and j for each U-Net is the depth of the U-Net;
identifying a group of training samples, wherein each training sample in the group of training samples includes an image and a ground truth annotation that indicates at least two segments, each corresponding to one of at least two categories, within the image;
training the aggregate U-Net using the group of training samples, wherein training the aggregate U-Net comprises: for each training iteration in a series of training iterations and for each training sample in the group of training samples, calculating, for each node in the plurality of nodes $X^{i,j}$, a feature map $x^{i,j}$, wherein $x^{i,j}$ is based on a convolution operation performed on a down-sampling of an output from $X^{i-1,j}$ when j=0, and wherein $x^{i,j}$ is based on a convolution operation performed on an up-sampling operation of an output from $X^{i+1,j-1}$ when j>0; and
predicting a segmentation of a test image using the trained aggregate U-Net, wherein the predicted segmentation indicates a location of the at least two segments within the image corresponding to the at least two categories.

16. The non-transitory computer-readable medium of claim 15, wherein each node at level j receives j+1 inputs.

17. The non-transitory computer-readable medium of claim 15, wherein the aggregate U-Net is trained using deep supervision.

18. The non-transitory computer-readable medium of claim 15, wherein the method further comprises:
calculating, for each training iteration in the series of training iterations, an intermediate loss function at each node $X^{0,j}$ based on a comparison of a predicted segmentation output at each node $X^{0,j}$ and the ground truth annotations for training samples in the group of training samples; and
calculating an aggregate loss function that combines the intermediate loss functions of each node $X^{0,j}$, wherein the aggregate U-Net is trained using the aggregate loss function.

19. The non-transitory computer-readable medium of claim 15, wherein each image corresponding to a training sample in the group of training samples is a medical image of a portion of a body of a patient, and wherein the ground truth annotation indicates a first segment corresponding to a first category of the at least two categories associated with a healthy portion of the portion of the body represented in the medical image and a second segment corresponding to a second category of the at least two categories associated with a diseased portion of the portion of the body represented in the medical image.

20. The non-transitory computer-readable medium of claim 15, wherein the test image is a medical image of a portion of a body of a patient, and wherein the predicted segmentation of the test image includes a first segment corresponding to a first category of the two categories associated with a healthy portion of the portion of the body represented in the medical image and a second segment corresponding to a second category of the two categories associated with a diseased portion of the portion of the body represented in the medical image.

* * * * *